United States Patent
Abts et al.

(10) Patent No.: US 12,389,844 B1
(45) Date of Patent: Aug. 19, 2025

(54) METHOD AND APPARATUS FOR DELIVERING AN ADDITIVE UTILIZING AN IRRIGATION SYSTEM FOR FIELD APPLICATION

(71) Applicant: Fieldbot, LLC, Newport Beach, CA (US)

(72) Inventors: Gerald L. Abts, Highlands Ranch, CO (US); Kevin J. Abts, Newport Beach, CA (US)

(73) Assignee: FIELDBOT, LLC, Newport Beach, CA (US)

( * ) Notice: Subject to any disclaimer, the term of this patent is extended or adjusted under 35 U.S.C. 154(b) by 390 days.

(21) Appl. No.: 17/538,122

(22) Filed: Nov. 30, 2021

Related U.S. Application Data (60) Provisional application No. 63/120,004, filed on Dec. 1, 2020.

(51) Int. Cl.
  *A01G 25/16* (2006.01)
  *A01G 25/09* (2006.01)
  *B05B 1/20* (2006.01)
  *B05B 12/12* (2006.01)

(52) U.S. Cl.
  CPC ........... *A01G 25/16* (2013.01); *A01G 25/092* (2013.01); *B05B 1/20* (2013.01); *B05B 12/124* (2013.01)

(58) Field of Classification Search
  CPC ........ A01G 25/16; A01G 25/092; B05B 1/20; B05B 12/124
  USPC ............................ 239/69, 723, 726, 727, 734
  See application file for complete search history.

(56) References Cited

U.S. PATENT DOCUMENTS

| | | |
|---|---|---|
| 3,587,763 A | 6/1971 | Kinkead |
| 3,797,517 A | 3/1974 | Kircher |
| 3,807,436 A | 4/1974 | Pringle |
| 3,823,730 A | 7/1974 | Sandstrom |
| 3,902,668 A | 9/1975 | Daugherty |
| 3,952,769 A | 4/1976 | Ott |
| 3,979,062 A | 9/1976 | Christensen |
| 4,034,778 A | 7/1977 | Sage |
| 4,063,569 A | 12/1977 | Olson |
| 4,186,880 A | 2/1980 | Jacobi |
| 4,191,207 A | 3/1980 | Jacobi |
| 4,202,596 A | 5/1980 | Knudsen |
| 4,226,366 A | 10/1980 | Nortoft |

(Continued)

FOREIGN PATENT DOCUMENTS

WO 9728692 8/1997

*Primary Examiner* — Christopher S Kim
(74) *Attorney, Agent, or Firm* — ONE LLP (57) ABSTRACT

A method and apparatus for site-specific application of a fluid additive, with or without irrigation water, wherein a center pivot or lateral move irrigation system is utilized for a dedicated additive spraying system. Said spraying system including an additive pumping apparatus with a pump controller in communication with an irrigation system position sensor, and an additive pump in fluid communication with a reservoir of additive and a plurality of flow control valves. Said flow control valves each in fluid communication with an additive carrying conduit, said conduit terminating with an end-portion of conduit with spray nozzle set. Each said end-portion with spray nozzle set configured to apply additive to a ground surface below said end-portion and within the boundaries of polygon shaped areas of a field based on the position of the pipe spans, said position provided to the pump controller by the irrigation system position sensor.

10 Claims, 5 Drawing Sheets

(56) References Cited

U.S. PATENT DOCUMENTS

| | | |
|---|---|---|
| 4,266,732 A | 5/1981 | Sage |
| 4,290,556 A | 9/1981 | McConnell |
| 4,290,559 A | 9/1981 | Mayer |
| 4,303,203 A | 12/1981 | Avery |
| 4,340,183 A | 7/1982 | Kegel |
| 4,371,116 A | 2/1983 | Sage |
| 4,434,936 A | 3/1984 | Chapman |
| RE31,838 E | 2/1985 | Seckler |
| 4,508,269 A | 4/1985 | Davis |
| 4,564,224 A | 1/1986 | Korus |
| 4,569,481 A | 2/1986 | Davis |
| 4,580,731 A | 4/1986 | Kegel |
| 4,662,563 A | 5/1987 | Wolfe, Jr. |
| 4,763,836 A | 8/1988 | Lyle |
| 4,878,614 A | 11/1989 | Hach |
| 4,899,934 A | 2/1990 | Krisle |
| 5,246,164 A | 9/1993 | McCann |
| 5,255,857 A | 10/1993 | Hunt |
| 5,334,987 A | 8/1994 | Teach |
| 5,341,995 A | 8/1994 | Leatch |
| 5,613,641 A | 3/1997 | Grothen |
| 5,653,389 A | 8/1997 | Henderson |
| 5,695,129 A | 12/1997 | Korus |
| 5,740,038 A | 4/1998 | Hergert |
| 5,862,997 A | 1/1999 | Reinke |
| 5,904,296 A | 5/1999 | Doherty |
| 5,913,915 A | 6/1999 | McQuinn |
| 5,919,242 A | 7/1999 | Greatline |
| 5,927,603 A | 7/1999 | McNabb |
| 5,947,393 A | 9/1999 | Unruh |
| 5,950,921 A | 9/1999 | Cain |
| 5,955,973 A | 9/1999 | Anderson |
| 5,978,723 A | 11/1999 | Hale |
| 5,986,604 A | 11/1999 | Nichols |
| 5,991,694 A | 11/1999 | Gudat |
| 5,995,895 A | 11/1999 | Watt |
| 6,007,004 A | 12/1999 | Unruh |
| 6,036,121 A | 3/2000 | Gerdes |
| 6,036,122 A | 3/2000 | Gerdes |
| 6,042,031 A | 3/2000 | Christensen |
| 6,045,065 A | 4/2000 | Gerdes |
| 6,045,066 A | 4/2000 | Gerdes |
| 6,045,333 A | 4/2000 | Breit |
| 6,062,165 A | 5/2000 | Sieling |
| 6,068,197 A | 5/2000 | Tolson |
| 6,085,999 A | 7/2000 | Gerdes |
| 6,095,439 A | 8/2000 | Segal |
| 6,108,590 A | 8/2000 | Hergert |
| 6,199,000 B1 | 3/2001 | Keller |
| 6,290,151 B1 | 9/2001 | Barker |
| 6,337,971 B1 | 1/2002 | Abts |
| 6,469,628 B1 | 10/2002 | Richards |
| 6,507,782 B1 | 1/2003 | Rumbo |
| 6,512,992 B1 | 1/2003 | Fowler |
| 6,517,281 B1 | 2/2003 | Rissi |
| 6,522,948 B1 | 2/2003 | Benneweis |
| 6,594,706 B1 | 7/2003 | Decoursey |
| 6,633,786 B1 | 10/2003 | Majors |
| 6,666,384 B2 | 12/2003 | Prandi |
| 6,711,501 B2 | 3/2004 | McClure |
| 6,755,362 B2 | 6/2004 | Krieger |
| 6,820,828 B1 | 11/2004 | Greenwalt |
| 6,853,883 B2 | 2/2005 | Kreikmeier |
| 6,923,390 B1 | 8/2005 | Barker |
| 6,928,339 B2 | 8/2005 | Barker |
| 6,978,794 B2 | 12/2005 | Dukes |
| 7,384,008 B1 | 6/2008 | Malsam |
| 7,584,023 B1 | 9/2009 | Palmer |
| 7,584,053 B2 | 9/2009 | Abts |
| 7,976,284 B2 | 7/2011 | Koehl |
| 8,028,470 B2 | 10/2011 | Anderson |
| 8,145,360 B2 | 3/2012 | Brundisini |
| 8,401,704 B2 | 3/2013 | Pollock |
| 8,490,899 B2 | 7/2013 | Korus |
| 8,738,212 B1 | 5/2014 | Schieffelin |
| 8,849,468 B2 | 9/2014 | Abts |
| 8,948,979 B2 | 2/2015 | Malsam |
| 9,329,580 B2 | 5/2016 | Heuert |
| 9,342,076 B2 | 5/2016 | Malsam |
| 9,374,949 B2 | 6/2016 | Abts |
| 9,459,628 B1 | 10/2016 | Abts |
| 9,661,808 B2 | 5/2017 | Abts |
| 9,874,489 B1 | 1/2018 | Jerphagnon |
| 9,888,081 B1 | 2/2018 | Farinelli, Jr. |
| 10,048,663 B2 | 8/2018 | Abts |
| 10,130,054 B2 | 11/2018 | Abts |
| 10,165,741 B2 | 1/2019 | Abts |
| 10,384,557 B2 | 8/2019 | Abts |
| 10,582,671 B2 | 3/2020 | Abts |
| 2002/0008167 A1 | 1/2002 | Haberland |
| 2002/0066810 A1 | 6/2002 | Prandi |
| 2003/0066912 A1 | 4/2003 | Krieger |
| 2003/0229432 A1 | 12/2003 | Ho |
| 2004/0093912 A1 | 5/2004 | Krieger |
| 2004/0117070 A1 | 6/2004 | Barker |
| 2006/0027677 A1 | 2/2006 | Abts |
| 2007/0267524 A1 | 11/2007 | Mack |
| 2008/0269956 A1 | 10/2008 | Dix |
| 2009/0216410 A1 | 8/2009 | Allen |
| 2010/0032493 A1 | 2/2010 | Abts |
| 2010/0032495 A1 | 2/2010 | Abts |
| 2010/0141194 A1 | 6/2010 | Koehl |
| 2011/0181226 A1 | 7/2011 | Steiner |
| 2012/0053776 A1 | 3/2012 | Malsam |
| 2012/0253530 A1 | 10/2012 | Malsam |
| 2012/0305682 A1 | 12/2012 | Korus |
| 2013/0018509 A1 | 1/2013 | Korus |
| 2013/0018553 A1 | 1/2013 | Malsam |
| 2013/0090766 A1 | 4/2013 | Pfrenger |
| 2013/0211717 A1 | 8/2013 | Abts |
| 2013/0218402 A1 | 8/2013 | Hoshihara |
| 2013/0226356 A1 | 8/2013 | Pfrenger |
| 2013/0253752 A1 | 9/2013 | Grabow |
| 2013/0341419 A1 | 12/2013 | Pfrenger |
| 2014/0225747 A1 | 8/2014 | Abts |
| 2014/0263706 A1 | 9/2014 | Wolgast |
| 2014/0326808 A1 | 11/2014 | Malsam |
| 2015/0060580 A1 | 3/2015 | Welch |
| 2015/0102136 A1 | 4/2015 | Malsam |
| 2015/0129680 A1 | 5/2015 | Abts |
| 2015/0150200 A1 | 6/2015 | Abts |
| 2015/0351335 A1 | 12/2015 | Abts |
| 2016/0014982 A1 | 1/2016 | Malsam |
| 2016/0103162 A1 | 4/2016 | Safa-Bakhsh |

METHOD AND APPARATUS FOR DELIVERING AN ADDITIVE UTILIZING AN IRRIGATION SYSTEM FOR FIELD APPLICATION

REFERENCE TO RELATED APPLICATIONS

This application claims the priority benefit of U.S. Provisional Patent Application No. 63/120,004, filed Dec. 1, 2020, which is hereby incorporated by reference in its entirety.

BACKGROUND

Field of Invention

The present disclosure relates to field irrigation systems and more particularly pertains to methods and apparatuses for application of a fluid additive substance that may be pumped onto a field through a plurality of additive carrying conduits suspended from the structure of an irrigation system and spaced along and parallel to the longitudinal axis of the separate water bearing conduit, consisting of pipe spans, of said irrigation system. Each of the plurality of additive carrying conduits may originate from an additive pumping apparatus located proximate to the center structure of the irrigation system. In an example, an end-portion of conduit with spray nozzle set may extend over the last 130 feet (distal-end) of said additive carrying conduit and may be configured to deliver a fluid additive to a portion of the field underlying the end-portion of conduit with spray nozzle set. The combined lengths of the end-portions of conduit with spray nozzle set (fluid delivering components) of said distal-ends of each of the plurality of suspended additive carrying conduits may equal the total length of the water bearing conduit, also corresponding to the length of the plurality of pipe spans, and thereby serve to enable delivery of a fluid additive to any combination of the ground surface areas of a field underlying respective suspended 130-foot end-portions of conduit with spray nozzle set and to the entire field.

DESCRIPTION OF THE PRIOR ART

Field irrigation systems utilized to provide moisture to the plants and soil of an agricultural field are known, and it is known by those skilled in the art to use the systems to provide various beneficial substances (additives other than water) to the plants and soil by adding the substances to the available pressurized water supply prior to application of said water to the field by the irrigation system.

A common irrigation system design is a center pivot irrigation system in which a roving arm comprised of at least one pipe span supported above a ground surface by a support tower radiates outwardly from a center structure, and rotates or pivots about the center structure to move the pipe spans across the field while applying a primary fluid (water) to the soil and plants of the field. Another irrigation system design is a lateral move irrigation system in which the entirety of the pipe spans supported by corresponding support towers moves across the ground surface of the field in a translational, rather than a pivoting movement.

Any plurality of pipe spans, corresponding to the water bearing conduit, each typically supported by support towers carried on wheels driven to move the support towers, and the supported pipe spans, across the ground surface. In some installations, the positioning of auxiliary fluid-spraying guns on the end of the outermost pipe span may be used to extend the area of the ground surface of the field on which the primary fluid is applied by the water-bearing conduit.

Areas of the ground surface of a field to which the primary fluid is being applied by the irrigation system may be referred to as field sectors. The field sectors may each be defined as the area irrigated by the irrigation system between two defined positions of the pipe spans of the irrigation system each extending from a center point to a point along the circumference of the circular field defined by the wheel tracks of an outermost support tower as said pipe spans transverse the field. In the case of a center pivot irrigation system, the field sectors may have a generally triangular or pie-shaped perimeter, while in the case of a lateral move irrigation system; the field sectors may be generally rectangular in shape.

Systems have been used to inject fluid products or additives into the available pressurized water supply (the primary fluid) of an irrigation system so that the combination of the water and the fluid additive may be applied to the plants or soil of the field. For example, the fluid products or additives may include crop fertilizers, herbicides, insecticides, fungicides, and fumigants.

Uniform application of each fluid additive to the plants or soil may be important for maximizing the effectiveness and efficiency of the applications. While variations in the application rate of the primary fluid, water, from field sector to field sector is of some concern, variations in the application rate of the combined water and liquid or fluid additive can be more problematic, ranging from applying too little fluid additive to be effective, to applying too much additive which may waste the additive (at best) and may create toxic conditions (at worst).

Conventional fluid additive pumping (injection) systems typically depend on the operator to define the pace (speed) of movement of the irrigation system over the ground surface, and then also depend upon the irrigation system maintaining a predetermined speed of movement to achieve the set pace and, thereby, the uniform distribution of the fluid additive being injected or pumped into the available water supply at the desired rate for application to the plants soil.

In general, the prior art discloses means to vary the application of an available water supply, and any additives injected into the water supply, delivered to the field irrigated by a center pivot or lateral move system by changing the set pace of movement of the pipe spans of the irrigation system over the ground surface as said spans enter and leave defined pie-shaped field sectors, or in the case of lateral move systems, rectangular shaped field sectors.

However, there is further prior art for site-specifically applying water, and additives injected or pumped into the water, within the boundaries of polygon shaped areas that may be within the pie-shaped or square field rectangular shaped field sectors. This prior art is generally referred to as variable rate irrigation (VRI) wherein individual discharge sprinkler applicators, or groups of discharge sprinkler applicators, over the length of the water bearing conduit of a center pivot or lateral move system are pulsed or otherwise flow-adjusted to apply water and additives at varied rates to site-specific areas of the field, generally bounded on four sides and in the shape of polygons. The control over individual nozzle outlets making up the VRI water delivery pattern along the length of the water-bearing conduit may encompass over 200 individual discharge applicators or, at a minimum, multiple banks of said applicators on a typical irrigation system. These VRI systems are, therefore, costly to adopt, complex to operate, and may require frequent maintenance to keep the control elements in good working order.

A consideration for not adopting VRI systems is the general knowledge that a crop growing in a field with varying soil textures and topography of slopes and depressions may receive little benefit from varying the application of irrigation water to one field sector compared to other field sectors of the same field growing the same crop. The evapotranspiration (ET) rate for a crop at full canopy does not significantly vary due to changes in soil texture or slope. In other words, the growing crop generally consumes a level amount of available water throughout the field, based on weather conditions and growth stage of a crop.

Using VRI may get complicated in application and may be of little benefit. That may make only special conditions as the primary benefit to VRI. Examples of special conditions relating to irrigation of a field may include dewatering portions of the field not planted with a crop or dewatering a low lying section of the field that may be receiving runoff water. That said, the main benefit of adopting VRI may not be for improved irrigation, but rather for varying application of fluid additives pumped into the irrigation water, such as fertilizers, herbicides, foliates, and pesticides. Varying the application of these additives, and thereby treating site-specific areas of a field that may be known to be deficient in nutrients or may be yield-affected by pathogens and insects, may be of significant benefit to yield outcomes. Varying the application of water, not so much.

A general limitation to applying additives by injecting liquid solutions of additives into the copious flow of supply water to an irrigation system may be excess dilution, i.e., too much water. Some additives are configured to treat the foliage and not the root zone of plants. In the cases requiring treatment of foliage the excess water required for delivery of an additive along with the supply water (irrigation water) may flush excess amounts of additive off the foliage and onto the ground or into the ground surface where it may not be effective.

Recent developments in the prior art have disclosed methods for continuous movement of irrigation pipe spans while maintaining significant straight alignment (Krieger U.S. Pat. No. 6,755,362; Malsam U.S. Pat. No. 8,948,979; and Abts U.S. Pat. Nos. 10,130,054 and 10,165,741). These alignment improvements also have enabled much higher speeds of movement over the ground surface by the roving pipe spans of center pivot and lateral move irrigation systems. The higher speeds of movement, thereby, may mitigate some of the dilution effects of the water in ratio to fluid additives, enabling much more concentrated applications of additives as compared to slower moving irrigation systems.

For example, typical-sized irrigation systems may have a minimum rotation time (one pass over a field) of seven-hours, resulting in a minimum application of an available water supply of about 0.10 inches to the field. In contrast, the recently available high-speed irrigation systems utilizing constant move alignment may have rotation times of only ninety-minutes, resulting in a minimum application of a water supply of about 0.02 inches to the field, an 80% reduction of minimum water application. This higher speed of movement, along with higher pumping rates for injecting fluid additives, may serve to significantly diminish the dilution effects when injecting additives by pumping them into the available water supply of irrigation systems.

The inventors note that the present invention may serve to further enable the effective use of irrigation systems for the application of additives and may do so without requiring any simultaneous pumping of additive diluting irrigation water. Thus, the irrigation systems of the prior art, by implementation of the present invention, may be utilized as dedicated additive spraying systems, while maintaining full functionality as irrigation systems per all prior art.

SUMMARY

The present invention discloses a method and apparatus for distributing a fluid additive substance onto an irrigation field using a plurality of separate and discrete, additive carrying conduits, each conduit configured to uniformly deliver a fluid additive to a corresponding ground surface without requiring the simultaneous pumping of irrigation water. In application the present invention may be a means of repurposing an irrigation system, such as a center pivot, for use as a dedicated additive spraying system.

The present invention further discloses that said plurality of additive carrying conduits may each have a first-end in fluid communication with a corresponding flow control valve that in turn may be in fluid communication with a motorized additive pump of an additive pumping apparatus. Said pumping apparatus may include an AC motor with a variable frequency drive (VFD) or a switch reluctance DC motor (SRM) to provide variable motor speed control for powering said additive pump to maintain a constant fluid pressure at an additive discharge outlet. The additive pumping apparatus may also include a suitable reservoir containing fluid additive, and a fluid pathway between said reservoir and the additive pump. Said pumping apparatus may be positioned proximate to the center structure of the irrigation system and, using a VFD or a SRM, the additive pump of the pumping apparatus may be configured to maintain an optimum amount of discharge pressure for effective application of the fluid additive being pumped through any combination of the corresponding plurality of flow control valves each in fluid communication with the first-end of a plurality of corresponding fluid additive carrying conduits.

Each additive carrying conduit may be configured to enable uniform delivery of a fluid additive whenever a corresponding flow control valve is controlled open as determined by the pump controller of the additive pumping apparatus in communication with the irrigation system position sensor. The determination of an opened or a closed operating status by the pump controller for each corresponding flow control valve may be based on a current position of the pipe spans within a field sector, said position monitored and reported by said irrigation system position sensor. Each additive carrying conduit may be configured to apply a fluid additive through an end-portion of conduit with spray nozzle set, with said spray nozzles evenly spaced along the end-portion of conduit, to thereby spray fluid additive to a discrete area of the field underlying the full length or a fraction of the full length of said additive carrying conduit. Said fraction of the full length may be an end-portion of said conduit with spray nozzle set preceding its distal-end.

For example, a first-additive carrying conduit may be a minimum of 130 feet in length from a first-end in fluid communication with a corresponding flow control valve and the pumping apparatus, both at the center structure, to a distal end of conduit. This first-additive carrying conduit may have a distal-end of conduit extending outward along the length of one or more pipe spans forming the axis of the longitudinal length of a water-bearing conduit of the dedicated additive spraying system. Said first-additive carrying conduit may be configured to deliver additive through a plurality of suitable discharge spray nozzles (e.g., a spray nozzle set) spaced accordingly along the entire 130 feet preceding the distal-end of conduit, said distal-end of conduit reaching to a point 130 feet outward from the center structure and along the innermost portion of the water bearing conduit.

Continuing with the example, a second additive carrying conduit may be a minimum of 260 feet in length from a first-end of additive carrying conduit in fluid communication with a corresponding flow control valve and the pumping apparatus, both located at the center structure, to a distal-end of conduit. This second additive carrying conduit may have a distal-end of conduit extending outward parallel to one or more pipe spans forming the axis of the longitudinal length of the water-bearing conduit of the dedicated additive spray system. Said second additive carrying conduit may be configured to deliver additive through a plurality of suitable discharge spray nozzles (e.g., a spray nozzle set) spaced accordingly along the 130 feet preceding the distal-end of conduit, said distal-end of conduit reaching to a point 260 feet outward from the center structure and along the water bearing conduit.

Again, continuing with the example, a third additive carrying conduit may be a minimum of 390 feet in length from a first-end of conduit in fluid communication with a corresponding flow control valve and the pumping apparatus, both located at the center structure, and a distal-end of conduit. This third additive carrying conduit may have a distal-end extending outward parallel to one or more pipe spans forming the axis of the longitudinal length of the water-bearing conduit of the dedicated additive spraying system. Said third conduit may be configured to deliver additive through a plurality of suitable discharge spray nozzles (e.g., a spray nozzle set) spaced accordingly along the 130 feet preceding the distal-end of conduit, said distal-end of conduit reaching to a point 390 feet outward from the center structure and along the water bearing conduit.

Continuing with the example configuration, additional additive carrying conduits, each, in an example, 130 feet longer in length than the prior and configured to deliver a fluid additive through suitable discharge spray nozzles spaced accordingly along the last 130 feet preceding a respective distal-end of conduit, may serve to provide additive discharge along the remainder of any total length of the water bearing conduit and any plurality of pipe spans of the dedicated additive spraying system.

Each of the plurality of additive carrying conduits, as disclosed above, may originate with a corresponding first-end of conduit in proximity with all other additive carrying conduits and each may be in fluid communication with the same or separate additive pump of an additive pumping apparatus by way of a corresponding on/off valve or flow control valve located between the additive discharge outlet of said pumping apparatus and the first-end of each respective additive carrying conduit.

A pump controller, in communication with an irrigation system position sensor, may include a memory and a processor and may be provided as a component of the additive pumping apparatus. The pump controller may be configured to control the plurality of corresponding flow control valves, each said valve in fluid communication with the pumping apparatus and the first-end of corresponding additive carrying conduits. The control of corresponding flow control valves from opened to closed and closed to opened may be determined based on the position (angle) of the pipe spans as provided to the pump controller by the irrigation system position sensor located approximately above the outermost wheel track of the outermost support tower. Said reported position of the pipe spans being used by a processor for determining applications of an additive to discrete polygon shaped areas of the field per parameters within a fluid additive prescription stored in memory.

The above configuration of any plurality of additive carrying conduits, each separate from the water bearing conduit, may enable the application of a fluid additive flowing through any combination of a plurality of additive carrying conduits or through all said conduits. Thereby, the fluid additive may be applied to a ground surface or a growing crop within the boundaries of polygon shaped areas of the field, in the example said boundaries being 130 feet on the vertical sides and, thereby, corresponding to the 130-foot end-portion of conduit with spray nozzle set. The two side boundaries defining the depth of each polygon shaped area may be defined by the moving pipe spans of the irrigation system as said spans transition along wheel tracks across a field sector of a field from a sector start position to a sector stop position while the corresponding flow control valve is controlled open.

In application any number of additive carrying conduits may be configured, each with a corresponding flow control valve at its first-end that may be in fluid communication with one or more additive pumping apparatuses, and a corresponding end-portion of conduit with spray nozzle sets. For each additive carrying conduit, any fractional length, making up an end-portion of said conduit's length preceding a distal-end may be configured with a corresponding set of discharge spray nozzles suitable for application of a fluid additive to a corresponding ground surface. In this manner, the length of each end-portion of additive carrying conduit with spray nozzle set may be varied according to the degree of variability and precision required for effective application of fluid additives to within the boundaries of correspondingly sized polygon shaped areas in a field.

The rate of application of a fluid additive to any area of the field may conventionally be varied by adjusting the pace of movement of the pipe spans of the dedicated additive spraying system (assumes fluid additive is being pumped at a constant rate of flow or pressure) as the roving pivot arm of pipe spans transverses along wheel tracks of any field sector with any combination of additive carrying conduits activated or inactivated to discharge or not discharge a fluid additive to polygon shaped areas within the field sectors of the field.

The present invention may also include mechanical pressure sensitive valves positioned at each additive conduit juncture of a first-portion of corresponding additive carrying conduits that does not include a plurality of discharge spray nozzles (in the example, all but the last 130 feet) and an end-portion of the additive carrying conduits that does include a plurality of discharge spray nozzles (e.g., the 130 feet preceding each distal-end). Said mechanical pressure sensitive valves may each serve as a check valve that cuts off the outward flow of a fluid additive at said additive conduit juncture until a certain threshold of line pressure, in the corresponding additive carrying conduit, may be exceeded at said juncture. Said line pressure being acted on by the additive pump of the additive pumping apparatus whenever a corresponding flow control valve, in fluid communication with the pumping apparatus, may be in the open or on position. By this means a first-portion of the additive carrying conduit, said portion being all but the 130 feet preceding the distal-end, i.e., the first-portion of each additive carrying conduit, may remain full (charged with fluid additive) and not drain when the corresponding flow control valve may be closed and line pressure may drop below said threshold.

Use of a mechanical pressure sensitive valve as disclosed above may enable a quantity of fluid additive to remain in said first-portion of conduit after loss of line pressure and, thereby, may not require a refill of said first-portion of conduit when said flow control valve may be controlled back open. Such mechanical pressure sensitive valves may also result in a timelier cut-off of additive flow to the end-portion of conduit with spray nozzle set, providing more precision of fluid additive application to prescribed areas.

The corresponding mechanical pressure sensitive valves, thereby, may maintain a fluid additive in the first-portion of respective additive carrying conduits even with below threshold line pressure and during the period of time a corresponding flow control valve may be closed or off. Once a corresponding flow control valve may be controlled from closed to open, providing above threshold line pressure, a fluid additive may immediately flow into the end-portion of said conduit, in the example the 130 feet at the distal-end of conduit that includes discharge spray nozzles. This method of using a mechanical pressure sensitive valve at each additive conduit juncture positioned between a corresponding first-portion and an end-portion of an additive carrying conduit may provide more uniform discharge of fluid additive applicant to the ground or to a growing crop within the boundaries of respective polygon shaped areas within the sectors requiring application of fluid additives.

In other embodiments of the present invention, and continuing with the same example, the position of a flow control valve may be changed to being positioned at the additive conduit juncture of a first-portion of a corresponding additive carrying conduit that does not include a plurality of discharge spray nozzles (in the example, all but the last 130 feet) and an end-portion of the additive carrying conduit that does include a plurality of discharge spray nozzles (e.g., the 130 feet preceding each distal-end of conduit). In this configuration said repositioned flow control valve would also serve the purpose of the mechanical pressure sensitive valve discussed above, making said pressure sensitive valve unnecessary.

Thus, in a preferred embodiment, the present invention discloses a method and apparatus for spatially varying the application of fluid additives pumped onto a field using an irrigation system for field application. In effect, the present invention may enable the broad-scale repurposing of irrigation systems from conventional irrigation machines into being dedicated additive spraying systems capable of applying a wide variety of fluid additives within the boundaries of discrete polygon shaped areas within sectors of a field, including the application of fertilizers, herbicides, foliates, and pesticides, and to do so with or without the simultaneous pumping of a primary fluid, available water supply, through the conventional water bearing conduit of the irrigation system.

The benefits to irrigators from adoption of the methods and apparatuses as disclosed by the present invention may be made even greater due to recent agronomic developments relating to field mapping techniques, in particular Graphic Information Systems (GIS) as applied to fields of agricultural crops being produced. In general GIS provides a framework for gathering, managing, and analyzing copious amounts of data, in particular mapping data useful to the improvement of outcomes of growing crops. The mapping of yield results within a field may be useful in determining the yield potential for varying areas of a field. Yield maps may also provide data for planning crop seeding rates and seed varieties within a field. Typical large fields may produce a wide variety of yield results due to the variable soils, slopes, as well as variable amounts of nutrients available to a growing crop.

GIS may also enable analyses of spatial locations and may serve to organize layers of information into visualizations using graphic maps and 3D scenes. Such data and information sets may be beneficially applied to fields of growing crops. A result may be a much greater potential of successfully deploying site-specific fluid additive prescriptions as remedies to treat mapped soil and crop deficiencies. Therefore, there may be a need to deliver crop inputs and treatments for disease and insect infestations site-specifically, based on GIS mapping techniques. The present invention may bring forward suitable methods and apparatuses for site-specifically applying requisite additives to fields of growing crops, said applications being delivered using site-specific prescriptions and flow control valve operational parameters that may be based on the field mapping information available through adoption of GIS techniques.

Another agronomic development may be aerial imagery of growing crops that may be layered into the visual maps derived from GIS. A plethora of sensors and cameras may detect crop conditions well ahead of conventional manual and visual scouting techniques and may do so site-specifically. Deployment of such devices as sensors and cameras may be further facilitated by drone technology as well as satellite and conventional aerial reconnaissance.

Yet, another means of field reconnaissance, using said cameras and sensors, may be to mount said sensors and cameras along the structural members of the pipe spans of the irrigation systems, including spectrum controlled sensor lighting systems. Recent development of much faster paced irrigation systems, e.g., 90-minute rotations, may make such deployment of sensors and cameras more effective than conventional drone or aerial scouting techniques. These concepts may provide real-time inputs of crop conditions and moisture levels in discrete areas of a field.

The resulting information from these several means of field and crop reconnaissance may be used to create fluid additive prescriptions providing operational parameters for s site-specific fluid additive treatments for a field. However, said prescriptions may only be beneficial if significantly site-specific means of deployment of said prescription of valve control parameters may be available. The present invention may serve as a platform for delivery of prescriptions for site-specific treatments of growing crops, taking great advantage of GIS, drone or aerial based sensor technology, and, most significantly, data from sensors and cameras mounted directly to fast-paced irrigation systems in the process.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter, and which will form the subject matter of the claims appended hereto.

In this respect, before explaining at least one embodiment or implementation in greater detail, it is to be understood that the scope of the disclosure may not be limited in its application to the details of construction and to the arrangements of the components, and the particulars of the steps, set forth in the following description or illustrated in the drawings. The disclosure may be capable of other embodiments and implementations and may thus be capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood when consideration is given to the drawings and the detailed description which follows. Such description makes references to the annexed drawings wherein.

DETAILED DESCRIPTION

With reference now to the drawings, and in particular to FIGS. 1 through 4, thereof, a new method and apparatus for pumping an additive onto a crop growing in a field or onto a ground surface of a field, served by an irrigation system, for field application of said additive embodying the principles and concepts of the disclosed subject matter will be described.

Figure 1:
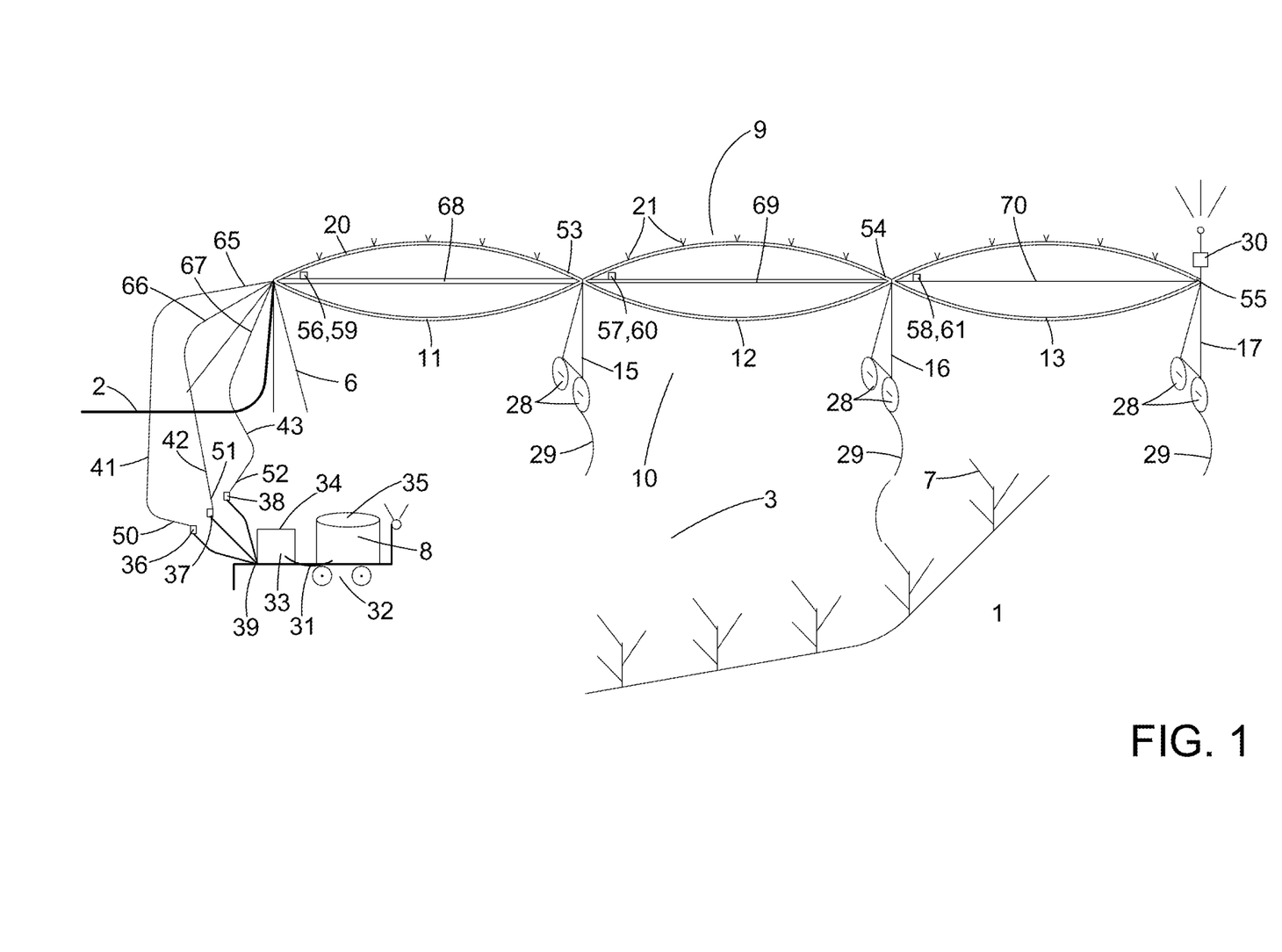
FIG. 1 is a schematic perspective diagrammatic view of a new apparatus, a dedicated additive spraying system, for pumping an additive onto a field through distinct and separate fluid additive conduits suspended from an irrigation system for field application according to the present disclosure.

Referring to the Figures, wherein like numerals indicate like or corresponding parts throughout the several views, an irrigation system 9 for conveying water from an available water supply 2 is illustrated in FIG. 1. Conventionally, a common irrigation system design is a "center pivot" irrigation system 9 in which a roving arm comprised of at least one pipe span 11, 12, 13, supported above a ground surface 3 by a support tower 15, 16, 17, radiates outwardly from a center structure 6, and rotates or pivots about the center structure 6 to move the pipe spans 11, 12, 13 along wheel tracks 29 and across a ground surface 3 of the field 1 while applying an available water supply 2 to the soil and plants of the field. Another irrigation system design is a lateral move irrigation system (not shown) in which an entirety of the pipe span (or spans) supported by corresponding support towers moves along parallel wheel tracks (not shown) across the surface of the field in a translational straight line movement, rather than a pivotal, movement.

Referring to FIG. 1, the pipe spans 11, 12, 13 may typically be supported by support towers 15, 16, 17 carried on wheels 28 driven to move the support towers 15, 16, 17 and the supported pipe spans 11, 12, 13, along corresponding wheel tracks 29, across the ground surface 3. The water bearing conduit 20 comprised of one or more pipe spans 11, 12, 13 may include a plurality of discharge sprinkler applicators 21. In some installations, the positioning of one or more large-volume fluid-spraying guns (not shown) on the end of the outermost pipe span 13 may be used to extend the area of the ground surface 3 of the field 1 on which an available water supply 2 is applied.

Figure 2:
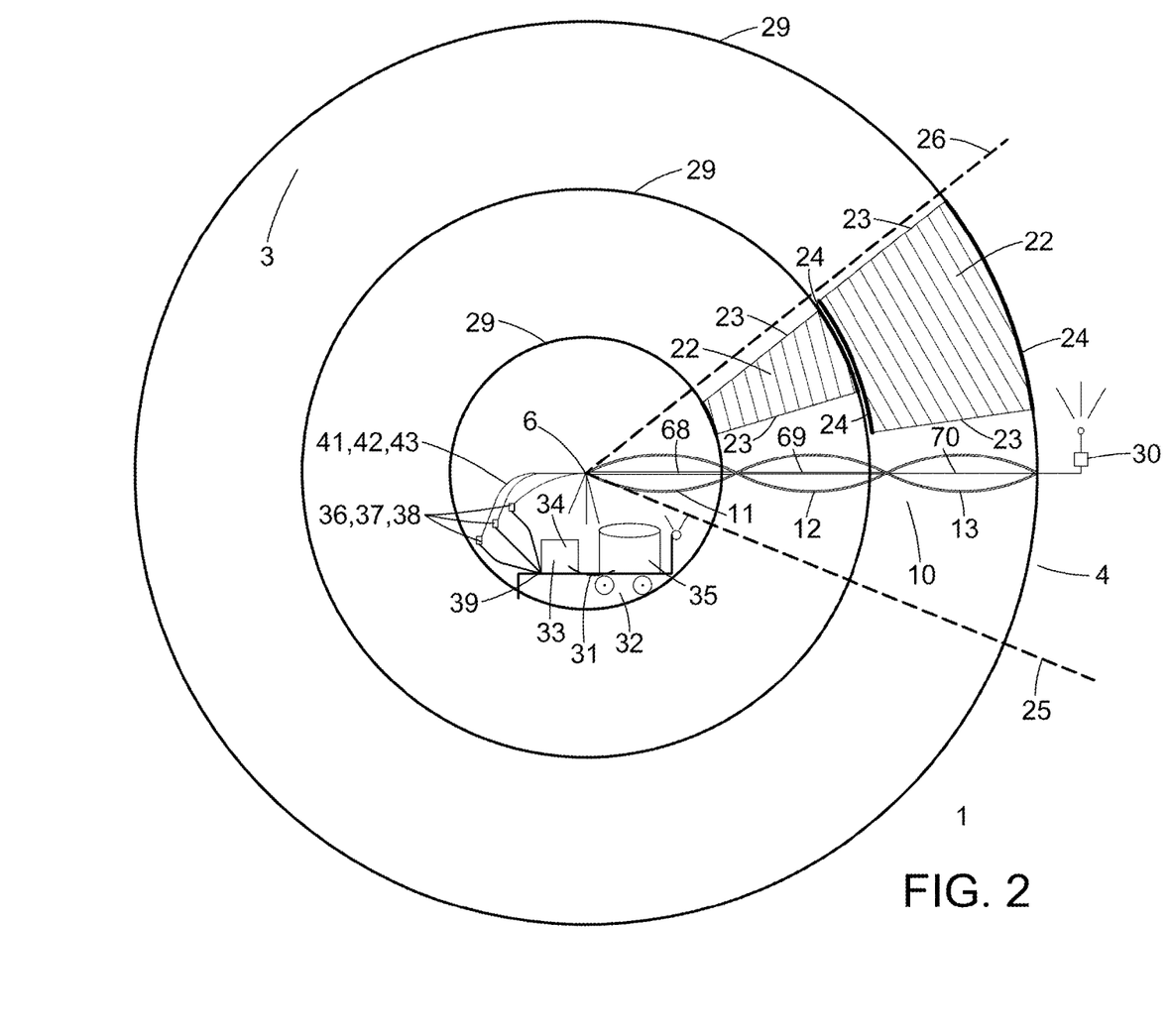
FIG. 2 is a schematic diagram of a field served by a dedicated additive spraying system with a highlighted defined field sector within which are boundaries of polygon shaped areas illustrating aspects of an illustrative implementation of a method of the present disclosure.

With reference to FIG. 2, areas of the field 1 ground surface 3 to which an available water supply 2 may be applied by the irrigation system 9 may be referred to as field sectors 4. The field sectors 4 may each be defined as the area irrigated, using an available water supply 2, by the irrigation system 9 between two defined angular positions, a sector start position 25 and a sector stop position 26, of the pipe spans 11, 12, 13 of the irrigation system 9 as said spans transverse along wheel tracks 29 of the field 1.

In the case of a center pivot irrigation system 9, the field sectors 4 may have a generally triangular or pie-shaped perimeter bounded by a sector start position 25 and a sector stop position 26. In the case of a lateral move irrigation system; the field sectors (not shown) may be generally rectangular in shape.

Conventionally, the irrigation system 9 may be used for a multitude of purposes. Therefore, with reference to FIG. 1, it may to be understood while the conventional and main purpose of the irrigation system 9 may be for application of an available water supply 2 (irrigation water) to a field 1 to irrigate growing crops 7 growing in a field 1 with a ground surface 3, the present invention discloses methods and apparatuses to utilize said conventional irrigation systems 9 of the prior art into a dedicated additive spraying systems 10, with or without the simultaneous application of an available water supply 2 through the water bearing conduit 20 of said dedicated additive spraying system 10. Thus, the irrigation systems 9 of the prior art may, by implementation of the present invention, be utilized as a dedicated additive spraying system 10, while maintaining full functionality as an irrigation system 9 per all prior art.

Referring now to FIG. 1, each additive carrying conduit 41, 42, 43 may be suitably suspended from the structure of said irrigation system 9 and each said conduit 41, 42, 43 may be configured with an end-portion of conduit with spray nozzle set 68, 69, 70 to uniformly deliver an additive 8 to the ground surface 3 underlying said end-portion of conduit with spray nozzle set 68, 69, 70. The application of a fluid additive 8 as herein disclosed and as illustrated in FIG. 1 may be exercised with or without the simultaneous application of an available water supply 2 to said field 1 by the irrigation system 9, said irrigation system 9 now utilized for the methods and apparatuses disclosed by the present invention into a dedicated additive spraying system 10.

Continuing with reference to FIG. 1, the present invention further discloses that said plurality of additive carrying conduits 41, 42, 43 may each have a first-end of additive carrying conduit 50, 51, 52 in fluid communication with a corresponding flow control valve 36, 37, 38 that in turn may each be in fluid communication with an additive discharge outlet 39 of an additive pump 33 of an additive pumping apparatus 32. Said additive pumping apparatus 32 may include an AC power unit for powering said additive pump 33 that may include a variable frequency drive (FVD) or a switch reluctance DC power unit (SRM) (said power units not shown). Said additive pumping apparatus 32 may also include one or more suitable reservoirs 35 each containing fluid additives 8 and a corresponding additive fluid pathway 31 between Reservoirs 35 and additive pump 33. Said additive pumping apparatus 32 may be located proximate to the center structure 6 of the dedicated additive spraying system 10 (i.e., the utilized irrigation system 9) and may be configured to maintain a set amount of discharge pressure at an additive discharge outlet 39 in fluid communication with a plurality of flow control valves 36, 37, 38, each said valve in turn in fluid communication with a plurality of first-ends 50, 51, 52 of the plurality of corresponding additive carrying conduits 43, 44, 45.

Each additive carrying conduit 41, 42, 43 may be configured to enable delivery of an additive 8 to discrete areas of the field 1, i.e., the ground surface 3 underlying the full length or a fraction of the full length of said additive carrying conduit 41, 42, 43. The fraction of said full length may be an end-portion of conduit with spray nozzle set 68, 69, 70 of said conduit 41, 42, 43 preceding a distal-end of conduit 53, 54, 55. Each said end-portion of conduit with spray nozzle set 68, 69, 70 of said additive carrying conduits 41, 42, 43 may be configured with a plurality of evenly spaced spray nozzles making up the spray nozzle set of said end-portion of conduit with spray nozzle set 68, 69, 70. Each end-portion of conduit with spray nozzle set 68, 69, 70 may be configured to uniformly apply a fluid additive 8 to polygon shaped areas within the corresponding circular area of the field 1 underlying said end-portion of conduit with spray nozzle set 68, 69, 70.

Figure 5:
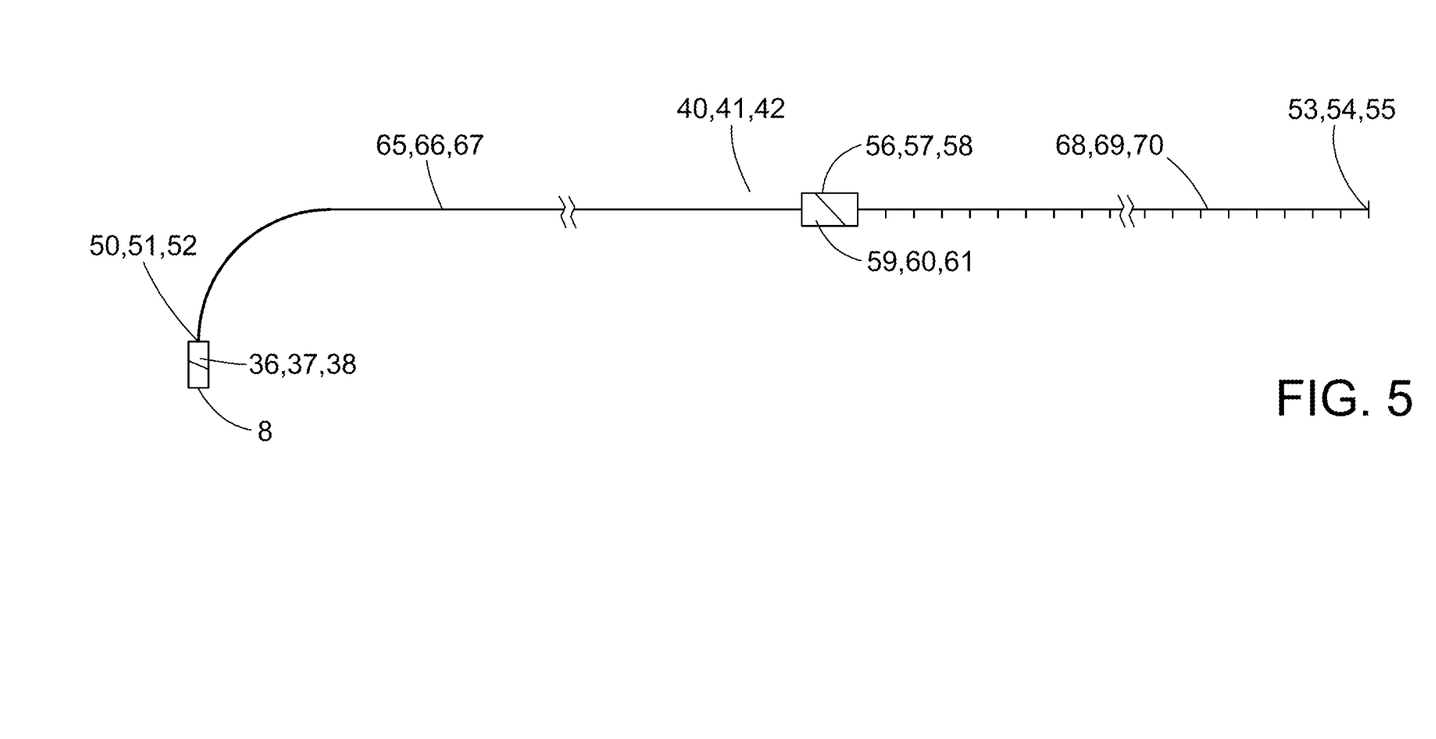
FIG. 5 is a schematic diagram of an additive carrying conduit with a corresponding flow control valve and with a mechanical pressure sensitive valve located at an additive conduit juncture of first-portion of additive carrying conduit and an end-portion of conduit with spray nozzle set illustrating aspects of an illustrative implementation of a method of the present disclosure.

For further clarity and with reference to FIG. 5, a flow control valve 36, 37,38 is illustrated with its corresponding additive carrying conduit 41, 42, 43. FIG. 5 further details the components of the additive carrying conduit 41, 42, 43 making up a first-end of additive carrying conduit 50, 51, 52, a first-portion of additive carrying conduit 65, 66, 67, an end-portion of conduit with spray nozzle set 68, 69, 70 and a distal end of conduit 53, 54, 55.

Continuing with FIG. 5, said first-portion of additive carrying conduit 65, 66, 67 and the end-portion of conduit with spray nozzle set 68, 69, 70 may be joined at an additive conduit juncture 56, 57, 58 by a mechanical pressure sensitive valve 59, 60, 61. The mechanical pressure sensitive valve 59, 60, 61, may close off the flow of fluid additive 8 when a line pressure in the additive carrying conduit 41, 42, 43 may drop below a threshold pressure due to a closed flow control valve 37, 38, 39.

Thus, the mechanical pressure sensitive valve 59, 60, 61 may serve the function of a check-valve to cut off the flow of fluid additive 8 from a first-portion of additive carrying conduit outward through additive conduit juncture 56, 57, 58 past the mechanical pressure sensitive valve 59, 60, 61. Thereby, with the mechanical pressure sensitive valve 59, 60, 61 closed, the first-portion of additive carrying conduit 65, 66, 67 may remain fully charged with fluid additive 8.

This feature may prevent fluid additive 8 remaining in a first-portion of additive carrying conduit from flowing through additive conduit juncture 56, 57, 58 to an end-portion of conduit with spray nozzle set 68, 69, 70 after a corresponding flow control valve 36, 37, 38 may be closed. Also, the first-portion of additive carrying conduit 65, 66, 67 may remain fully charged with fluid additive 8 when a corresponding flow control valve 59, 60, 61 may be controlled open, driving a line pressure above a threshold pressure. Thereby, the additive fluid 8 may immediately begin flowing through additive conduit juncture 56, 57, 58 and mechanical pressure sensitive valve 59, 60, 61 into the end-portion of conduit with spray nozzle set 68, 69, 70 as a corresponding flow control valve 37, 38, 39 may be opened. The result may be a more precise application of fluid additive 8 within the boundaries of polygon shaped areas 22 within a field sector 4 of a field 1.

With reference to FIG. 2, the present invention discloses methods and apparatuses for site-specifically distributing a fluid additive 8 (liquid substance) onto the ground surface 3 of an irrigation field 1 and within the boundaries of any plurality of polygon shaped areas 22 using any plurality of separate and discrete additive carrying conduits 41, 42, 43 each with a corresponding end-portion of conduit with a spray nozzle set 68, 69, 70.

For example, and with reference to FIG. 1, a first additive carrying conduit 41 may be a minimum of 130 feet in length from a first-end of first additive carrying conduit 50 in fluid communication with a first flow control valve 36 and the pumping apparatus 32, both proximate to the center structure 6. This first additive carrying conduit 41 may have an end-portion of first conduit with spray nozzle set 68 extending outward and parallel to a length of the water bearing conduit 20 of the dedicated additive spraying system 10, said end-portion of first conduit 68 terminating at a distal-end of first conduit 53. Said first additive carrying conduit 41 may include an end-portion of first conduit with a spray nozzle set 68 to deliver a fluid additive 8 through a plurality of suitable discharge spray nozzles spaced accordingly along the entire 130 feet preceding the distal-end of first conduit 53, said distal-end of first conduit 53 reaching to a point 130 feet outward from the center structure 6 and along the innermost portion of the water bearing conduit 20 ending at the wheel track 29 of a first support tower 15.

Continuing with the example, and with reference to FIG. 1, a second additive carrying conduit 42 may be a minimum of 260 feet in length from a first-end of second additive carrying conduit 51 in fluid communication with a second flow control valve 37 and the pumping apparatus 32, both located proximate to the center structure 6. This second additive carrying conduit 42 may have an end-portion of second conduit with spray nozzle set 69 extending outward and parallel to a length of the water bearing conduit 20 of the dedicated additive spraying system 10, said end-portion of second conduit 69 terminating at a distal-end of second conduit 54. Said second additive carrying conduit 42 may include an end-portion of second conduit with a spray nozzle set 69 to deliver a fluid additive 8 through a plurality of suitable discharge spray nozzles spaced accordingly along the entire 130 feet preceding the distal-end of second conduit 54, said distal-end of second conduit 54 reaching to a point 260 feet outward from the center structure 6 and along an intermediate portion of the water bearing conduit 20 ending at the wheel track 29 of a second support tower 16.

Continuing again with the example, and with reference to FIG. 1, a third additive carrying conduit 43 may be a minimum of 390 feet in length from a first-end of third conduit 52 in fluid communication with a third flow control valve 38 and the pumping apparatus 32, both located proximate to the center structure 6. This third additive carrying conduit 43 may have a distal-end of third conduit 55 extending outward parallel to the outermost length of the water-bearing conduit 20 of the dedicated additive spraying system 10. Said third additive carrying conduit 43 may include an end-portion of third conduit with a spray nozzle set 70 (e.g., 130-feet in length) to deliver additive 8 through a plurality of suitable discharge spray nozzles spaced accordingly along the entire 130 feet preceding a distal-end of third conduit 55, said distal-end of third conduit 55 reaching to a point 390 feet outward from the center structure 6 and along the outermost portion of the water bearing conduit 20 ending at the wheel track 29 of a third support tower 17.

Continuing with the above example of a dedicated additive spraying system 10 with three pipe spans 11, 12, 13 forming the axis of the longitudinal length of a water bearing conduit 20 of the dedicated additive spraying system 10, additional pipe spans (not shown) and additional additive carrying conduits (not shown), each, in an example, 130 feet longer in length than the prior and configured to deliver additive 8 through suitable end-portions of conduit with spray nozzles set 68, 69, 70 (not shown) with nozzles spaced accordingly along the last 130 feet preceding a respective distal-end of conduit 53, 54, 55 (not shown), may serve to provide a fluid additive 8 discharge parallel to any remainder of any total length of the water bearing conduit 20 (not shown) of the dedicated additive spraying system 10.

Each of the plurality of additive carrying conduits 41, 42, 43, as disclosed above, may be in fluid communication with an additive pump 33 of an additive pumping apparatus 32 by way of a corresponding on/off valve or flow control valve 36, 37, 38 located between the additive discharge outlet 39 of said pumping apparatus 32 and the first-end of additive carrying conduit 50, 51, 52 of each respective additive carrying conduit 41, 42, 43.

A pump controller 34 of the additive pumping apparatus 32 may be in communication with an irrigation system position sensor 30 located approximately above the outermost wheel track 29 of support tower 17. Said pump controller 34 may include a memory 45 and a processor 46. The pump controller 34 may be configured to control the plurality of corresponding flow control valves 36, 37 38 either opened or closed, each said valve 36, 37, 38 in fluid communication with the additive pump 33 of the additive pumping apparatus 32 and the corresponding first-end of additive carrying conduits 50, 51, 52.

Figure 4:
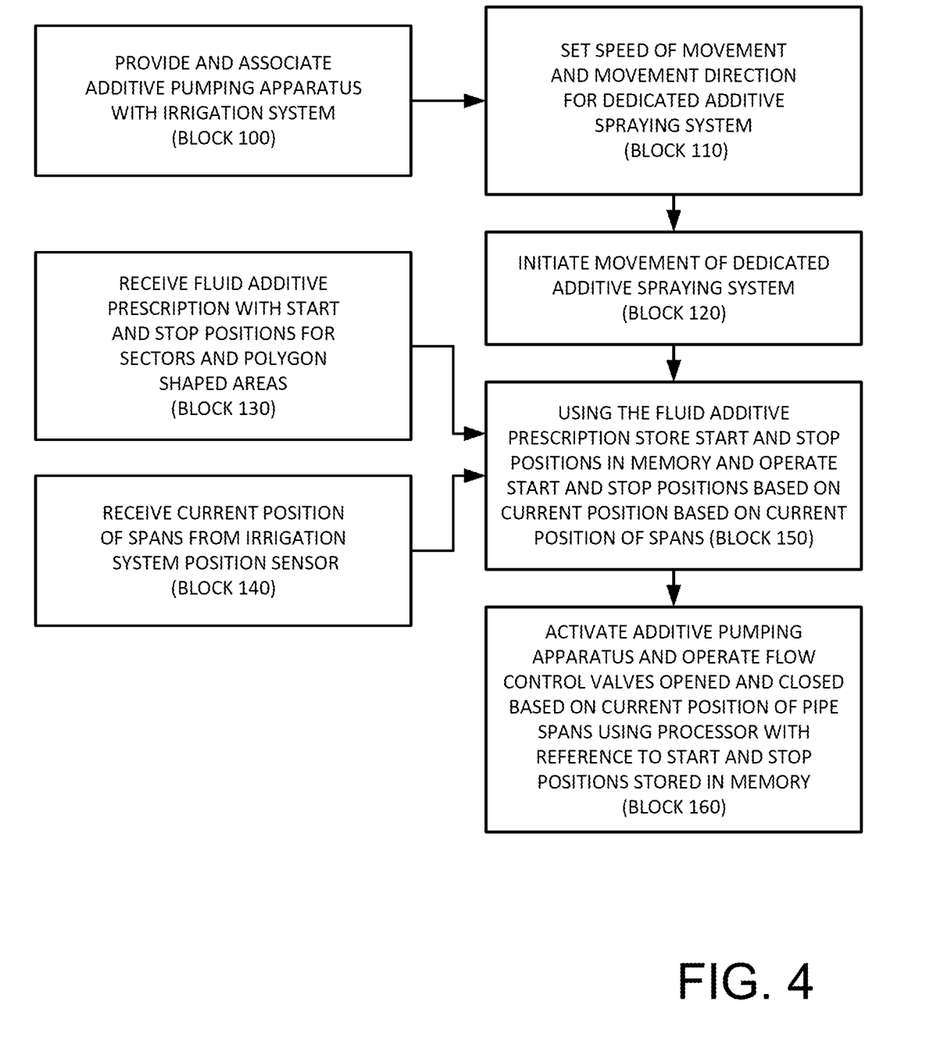
FIG. 4 is a schematic flow diagram of aspects of an illustrative implementation of a method of the present disclosure.

The control of corresponding flow control valves 36, 37, 38 from opened to closed and closed to opened may be determined based on the position (angle) of the pipe spans as provided to the pump controller 34 by the irrigation system position sensor 30 with respect to a reference point or position for the pipe spans 11, 12, 13. Said angle position of the pipe spans may constitute operating parameters to be used by a processor 46 of the pump controller 34 for determining application of an additive 8 to discrete areas of the field 1, said operating parameters being included in the fluid additive prescriptions 47 stored in memory 45. Said parameters of a fluid additive prescription 47 may define discrete polygon shaped areas 22 such as illustrated in FIG. 2 and again in FIG. 3 as polygon shaped areas 68-A, 69-A, 69-B, 70-A, 70-B.

For example, with reference to FIG. 2, the current position of the pipe spans 11, 12, 13 may be measured as an angular orientation of the longitudinal axis of the water bearing conduit 20 in a sector start position 25 with respect to an angular orientation of the pipe spans 11, 12, 13 in a reference position and a sector stop position 26 also with respect to an angular orientation of the pipe spans 11, 12, 13 in a reference position.

Referring again to FIG. 1, the pump controller 34 may be configured to control the plurality of corresponding flow control valves 36, 37, 38 either opened or closed, each said valve 36, 37, 38 in fluid communication with the additive discharge outlet 39 of additive pump 33 of pumping apparatus 32 and the corresponding first-end of additive carrying conduits 50, 51,52. The control of corresponding flow control valves 36, 37, 38 from opened to closed and closed to opened may be activated on by the pump controller 34 based on one or more operating parameters provided by fluid additive prescriptions 47. Said operating parameters, stored in memory 45 and provided to a processor 46, may provide corresponding start positions 25 and stop positions 26 of defined polygon shaped areas 22 within a field sector 4 and with reference to the current position (angle in degrees) of the pipe spans 11, 12, 13 as provided to the pump controller 34 by the irrigation system position sensor 30.

The above configuration of a plurality of additive carrying conduits 41, 42, 43, each separate from the water carrying conduit 20, may enable the application of a fluid additive 8 flowing through any combination of the plurality of additive carrying conduits 41, 42, 43 or through all said conduits 41, 42, 43.

With reference to FIG. 2, the fluid additive 8 may be applied within the boundaries of polygon shaped areas 22 of the field 1. In an example illustrated in FIG. 2, the respective two boundaries of the vertical length sides 23 of the polygon shaped areas 22 may each be 130-feet in length to correspond with the 130-foot length of the end-portion of conduit with spray nozzle set 68, 69, 70. In turn, the boundaries of the two depths of polygon 24 may be defined by the sector start position 25 and sector stop position 26 of the pipe spans 11, 12, 13 as said spans 11, 12, 13 traverse across a polygon shaped area 22 of a field sector 4 of a field 1 and while the corresponding flow control valves 37, 38 may be controlled open.

FIG. 3 is a more detailed illustrative map of the operating parameters of a fluid additive prescription 47 to provide treatment with an additive 8 for mapped areas of the field 1, said mapped areas being shaded in gray. Said operating parameters of a fluid additive prescription 47 may provide fluid additive 8 treatment, with or without using an available water supply 2 (shown in FIGS. 1 and 3), and with opened and closed operation of first, second and third flow control valves 36, 37, 38 (also shown in FIGS. 1 and 3), for treatment of five discrete polygon shaped areas 68-A, 69-A, 69-B, 70-A, 70-B of a field 1.

Referring to FIG. 3, the five discrete polygon shaped areas 68-A, 69-A, 69-B, 70-A, 70-B may each be substantially within corresponding gray shaded areas of the illustration, said gray shaded areas identifying areas needing treatment with a fluid additive 8 using a fluid additive prescription 47. Each of the discrete polygon shaped areas 68-A, 69-A, 69-B, 70-A, 70-B may be acted on using the operating parameters of the fluid additive prescription 47 to result in treatment of a substantial corresponding discrete portion of the shaded areas, i.e., prescribed treatment to discrete polygon shaped areas 68-A, 69-A, 69-B, 70-A, 70-B, with the additive 8.

FIG. 4 is a schematic flow diagram of aspects of an illustrative implementation of a method of the present disclosure as illustrated in FIGS. 1-3. An operator may provide and associate the additive pumping apparatus 32 with the irrigation system 9 to thereby utilize said irrigation system 9 as a dedicated additive spraying system 10 (Block 100). An operator may further set the speed of movement and a counter-clockwise direction of movement 18 for the dedicated additive spraying system 10 (Block 110) and initiate movement of the dedicated additive spraying system 10 (Block 120).

Figure 3:
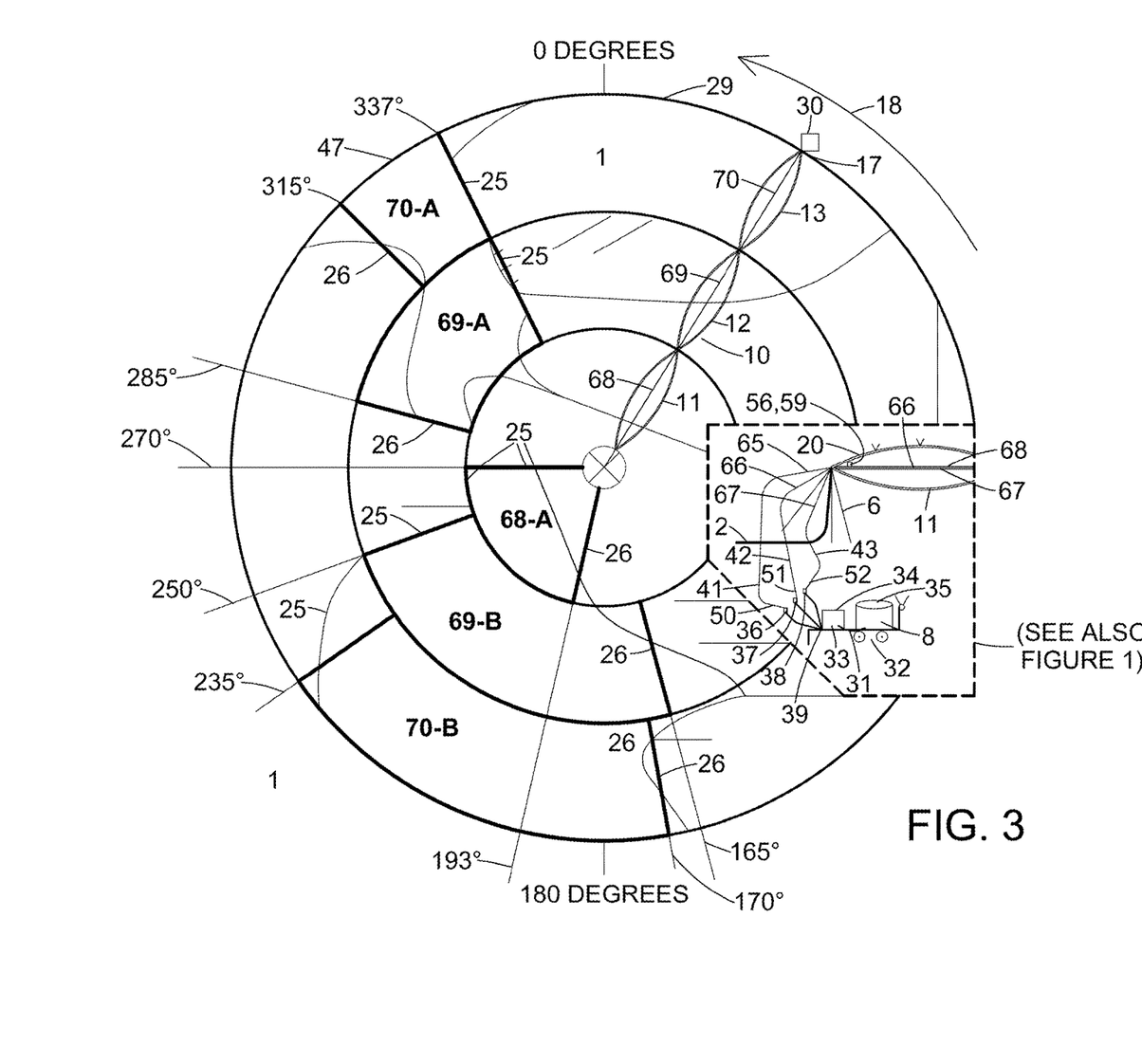
FIG. 3 is a field map illustrating five discrete polygon shaped areas that may each be treated with a fluid additive based on operating parameters provided by a fluid additive prescription and stored in memory.

An operator may provide a fluid additive prescription 47 with operating parameters defining start positions 25 and stop positions 26 for treatment of field sectors 4 and corresponding polygon shaped areas 68-A, 69-A, 69-B, 70-A, 70-B within said sectors 4 (block 130 and FIG. 3).

The irrigation system position sensor 30 may provide to the processor 46 of the pump controller 34 the current position in degrees of the pipe spans 11, 12, 13 (Block 140).

The pump controller 34 may store in memory 45 the operating parameters defining start positions 25 and stop positions 26 corresponding with any plurality of polygon shaped areas 68-A, 69-A, 69-B, 70-A, 70-B of a field 1 for comparison by a processor 46 to the current position of the pipe spans (Block 150).

With reference to Block 160, pumping of the fluid additive 8 by the additive pumping apparatus 32 may be controlled based on the start position 25 and stop position 26 operating parameters of the fluid additive prescription 47 for corresponding polygon shaped areas 68-A, 69-A, 69-B, 70-A, 70-B of a field 1. With said operating parameters stored in memory 45, a processor 46 may initiate pumping of a fluid additive 8 through corresponding flow control valves 37, 38, 39 when a current pipe span position, as provided by the end-of system position sensor 30, corresponds to a sector start positions 25 of a corresponding polygon shaped areas 68-A, 69-A, 69-B, 70-A, 70-B of a field 1. Similarly, a processor 46 may discontinue pumping of a fluid additive 8 through corresponding flow control valves 37, 38, 39 when a current pipe span position, as provided by the end-of system position sensor 30, corresponds to a sector stop positions 26 of a corresponding polygon shaped areas 68-A, 69-A, 69-B, 70-A, 70-B of a field 1. Said start positions 25 and stop positions 26 may be defined by degree points along the circumference of the outermost wheel track 29 of the outermost support tower 17 of the field 1.

As the pipe spans 11, 12, 13 reach a current position, said current position provided by the irrigation system position sensor 30, that corresponds with a sector start position 25 (a degree point along outermost wheel track 29) of a corresponding polygon shaped area 68-A, 69-A, 69-B, 70-A, 70-B of a field 1, the pump controller 34 using a processor 46, based on stored operating parameters in a fluid additive prescription 47, may activate a corresponding flow control valve 37, 38, 39 to open (Block 160). This action may initiate the flow of fluid additive 8 to a corresponding polygon shaped area 68-A, 69-A, 69-B, 70-A, and 70-B.

Similarly, as the pipe spans 11, 12, 13 reach a current position, said current position provided by the irrigation system position sensor 30, that corresponds with a sector stop position 26 (a degree point along outermost wheel track 29) of a corresponding polygon shaped area 68-A, 69-A, 69-B, 70-A, 70-B of a field 1, the pump controller 34 using a processor 46 may deactivate a corresponding flow control valve 37, 38, 39 and cause said valve to close (Block 160). This action stops the flow of fluid additive 8 to the corresponding polygon shaped area 68-A, 69-A, 69-B, 70-A, and 70-B.

The sector start positions 25 and sector stop positions 26 may each be stored in memory 45 as operating parameters of a fluid additive prescription 47 (Block 150). Processor 46 monitors the pipe span 11, 12, 13 current position, as output and reported by the irrigation system position sensor 30, and compares said reported current position to corresponding sector start positions 25 and sector stop positions 26 corresponding to each polygon shaped area 68-A, 69-A, 69-B, 70-A, 70-B (as stored in memory 45). Based on said comparison of current position to the stored start positions 25 and stop positions 26 said processor 46 may activate the respective flow control valves 36, 37, 38 to be correspondingly opened and closed for discrete application of fluid additive 8 to each polygon shaped area 68-A, 69-A, 69-B, 70-A, 70-B of a field 1 (Block 160).

By way of an example and with reference to FIG. 3, assume that the spans 11, 12, 13 may be moving in a counter-clockwise movement direction 18 and that the irrigation system position sensor 30 may be in communication with the pump controller 34 of the additive pumping apparatus 32 at the center structure 6 of dedicated additive spraying system 10. As the spans 11, 12, 13 of dedicated additive spraying system 10 achieve a sector start position 25 of 337 degrees, said degree position taken from an outermost wheel track 29 of an outermost support tower 17 and communicated by the end-of system position sensor 30 to additive pumping apparatus 32. The additive pumping apparatus 32 may be configured by fluid additive prescription 47, stored in memory 45, to begin delivering additive 8 from reservoir 35 to polygon shaped area 70-A by opening the third flow control valve 38 (also shown in FIGS. 1 and 2). Said fluid additive 8 may be pumped through opened third flow control valve 38 into the end-portion of third conduit with spray nozzle set 70 for initiating application of fluid additive 8 to the polygon shaped area 70-A, said polygon shaped area 70-A including an outer portion of a sector with a start position 25 at 337 degrees.

Simultaneously, based on the same sector start position 25 at degree 337, the additive pumping apparatus 32 may be configured by fluid additive prescription 47, stored in memory 45, to begin delivering additive 8 from reservoir 35 to polygon shaped area 69-A by opening the second flow control valve 37 (also shown in FIGS. 1 and 2). Said fluid additive 8 may be pumped through opened second flow control valve 37 into the end-portion of second conduit with spray nozzle set 69 to polygon shaped area 69-A, said polygon shaped area 69-A including an intermediate portion of a sector with a start position 25 at 337 degrees.

Continuing the example and with reference to FIG. 3, as the spans 11, 12, 13 of dedicated additive spraying system 10 may advance in the counter-clock movement direction 18 to a sector stop position 26 at 315 degrees, said degree position communicated by the end-of system position sensor 30 to additive pumping apparatus 32, the additive pumping apparatus 32 may be configured by fluid additive prescription 47 to close third flow control valve 38 to thereby stop delivery of additive 8 to polygon shaped area 70-A, but to continue delivery of additive 8 to polygon shaped area 69-A, using the opened flow control valve 37, said additive 8 being provided from reservoir 35 (shown in FIGS. 1 and 3).

Continuing the example and with reference to FIG. 3, as the spans 11, 12, 13 of dedicated additive spraying system 10 may achieve a sector stop position 26 at 285 degrees, said degree position communicated by the end-of system position sensor 30 to additive pumping apparatus 32, the additive pumping apparatus 32 may be configured by fluid additive prescription 47 to close second flow control valve 37 and thereby stop delivery of additive 8 through the end-portion of second conduit with spray nozzle set 69 to polygon shaped area 69-A. At this position of 285 degrees for spans 11, 12, 13 in the counter-clockwise movement direction 18 of the dedicated additive spraying system 10 both polygon shaped areas 70-A and 69-A have been treated with fluid additive 8 by fluid additive prescription 47 as applied to field 1.

Continuing the example and with reference to FIG. 3, as the spans 11, 12, 13 of dedicated additive spraying system 10 continue in a reverse movement direction 18 and achieve a sector start position 25 at 270 degrees, said degree position communicated by the end-of system position sensor 30 to additive pumping apparatus 32, the additive pumping apparatus 32 may be configured by fluid additive prescription 47 to open a first flow control valve 36 to thereby start delivery of additive 8 through end-portion of first conduit with spray nozzle set 68 to polygon shaped area 68-A.

Continuing the example and with reference to FIG. 3, as the spans 11, 12, 13 of dedicated additive spraying system 10 achieve a sector start position 25 at 250 degrees, said degree position communicated by the end-of system position sensor 30 to additive pumping apparatus 32, the additive pumping apparatus 32 may be configured by fluid additive prescription 47 to again open second flow control valve 37 to thereby start delivery of additive 8 through end-portion of second conduit with spray nozzle set 69 to polygon shaped area 69-B and to simultaneously keep first flow control valve 36 open to thereby continue delivery of additive 8 to the polygon shaped area 68-A.

Continuing the example and with reference to FIG. 3, as the spans 11, 12, 13 of dedicated additive spraying system 10 achieve a sector start position 25 at 235 degrees, said degree position communicated by the end-of system position sensor 30 to additive pumping apparatus 32, the additive pumping apparatus 32 may be configured by fluid additive prescription 47 to again open third flow control valve 38 to thereby start delivery of additive 8 through end-portion of third conduit with spray nozzle set 70 to polygon shaped area 70-B and to simultaneously continue delivery of additive 8 to the polygon shaped areas 68-A and 69-B by keeping both the first and second flow control valves 36, 37 opened and thereby supplying fluid additive 8 to the corresponding end-portion of first and second conduits with spray nozzle set 68, 69.

Continuing the example and with reference to FIG. 3, as the spans 11, 12, 13 of dedicated additive spraying system 10 achieve a sector stop position 26 at 193 degrees, said degree position communicated by the end-of system position sensor 30 to additive pumping apparatus 32, the additive pumping apparatus 32 may be configured by fluid additive prescription 47 to close first flow control valve 36 and thereby stop delivery of additive 8 through end-portion of first conduit with spray nozzle set 68 to polygon shaped area 68-A, but to simultaneously continue delivery of additive 8 to the polygon shaped areas 69-B and 70-B by keeping the second and third flow control valves 37, 38 opened.

Continuing the example and with reference to FIG. 3, as the spans 11, 12, 13 of dedicated additive spraying system 10 achieve a sector stop position 26 at 170 degrees, said degree position communicated by the end-of system position sensor 30 to additive pumping apparatus 32, the additive pumping apparatus 32 may be configured by fluid additive prescription 47 to close third flow control valve 38 to thereby stop delivery of additive 8 through end-portion of third conduit with spray nozzle set 70 to polygon shaped area 70-B, but to simultaneously continue delivery of additive 8 to the polygon shaped area 69-B by keeping the second flow control valves 37 opened.

Finally, continuing the example and with reference to FIG. 3, as the spans 11, 12, 13 of dedicated additive spraying system 10 achieve a sector stop position 26 at 165 degrees, said degree position communicated by the end-of system position sensor 30 to additive pumping apparatus 32, the additive pumping apparatus 32 may be configured by fluid additive prescription 47 to close second flow control valve 37 to thereby stop delivery of additive 8 through end-portion of second conduit with spray nozzle set 69 to polygon shaped area 69-B. This final step may complete the treatment of field 1 with a fluid additive 8 by a fluid additive prescription 47.

The following Table 1 may summarize the operating parameters detailed above for a fluid additive prescription 47 of a dedicated additive spraying system 10. Assuming a counter-clockwise movement direction 18, said prescription 47 may be used by a pump controller 34, of an additive pumping apparatus 32 in communication with an irrigation system position sensor 30, to control flow control valves 36, 37, 38 opened and closed to thereby apply a fluid additive 8 to polygon shaped areas 68-A, 69-A, 69-B, 70-A, 70-B of a field 1:

TABLE 1

OPERATING PARAMETERS OF FLUID ADDITIVE PRESCRIPTION 47

| DEGREE POSITION | | FLOW CONTROL VALVE STATUS | | |
|---|---|---|---|---|
| START 25 | STOP 26 | FIRST 36 | SECOND 37 | THIRD 38 |
| 337 | | closed | opened | opened |
| | 315 | closed | opened | closed |
| | 285 | closed | closed | closed |
| 270 | | opened | closed | closed |
| 250 | | opened | opened | closed |
| 235 | | opened | opened | opened |
| | 193 | closed | opened | opened |
| | 170 | closed | opened | closed |
| | 165 | closed | closed | closed |

In application any number of end-portion of conduit with spray nozzle set 68, 69, 70 of any plurality of dedicated, additive carrying conduits 41, 42, 43 may be configured, each with a corresponding flow control valve 36, 37, 38 at a corresponding first-end of additive carrying conduit 50, 51, 52 that may be in fluid communication with one or more additive pumping apparatuses 32. For each additive carrying conduit 41, 42, 43, any fractional length, making up an end-portion of conduit with spray nozzle set 68, 69, 70, preceding a distal-end of conduit 53, 54, 55, may be configured for application of a fluid additive 8 to a corresponding ground surface 3 within the boundaries of any plurality of polygon shaped areas 68-A, 69-A, 69-B, 70-A, 70-B of a field 1. In this manner, the length of each end-portion of conduit with spray nozzles set 68, 69, 70 may be varied according to the degree of variability and precision required for effective application of fluid additives 8 within the boundaries of any plurality of polygon shaped areas such as 68-A, 69-A, 69-B, 70-A, 70-B of a field 1.

With reference to FIG. 2, the rate of application of a fluid additive 8 within the boundaries (vertical length sides of polygon 23 and depth of polygon 24) of any polygon shaped area 22 of any field sector 4 of the field 1 may conventionally be varied by adjusting the pace of movement of the pipe spans 11, 12, 13 of the dedicated additive spraying system 10 as the roving pivot arm made up of pipe spans 11, 12, 13 transverses any field sector 4, from a sector start position 25 to a sector stop position 26, with any combination of additive carrying conduits 41, 42, 43 activated or inactivated by flow control valves 36, 37, 38 for any plurality of polygon shaped areas 22 to discharge or not discharge a fluid additive 8.

The operation assumes fluid additive 8 may be pumped through a corresponding additive carrying conduit 41, 42, 43 whenever a corresponding flow control valve 36, 37, 38 may be controlled open by the pump controller 34 based on a fluid additive prescription 47 and the position of the pipe spans 11, 12, 13 as communicated to the pump controller 34 by the irrigation system position sensor 30. Said flow of fluid additive 8 may be maintained constant by the level of pressure maintained by additive pump 33 at additive discharge outlet 39 of additive pumping apparatus 32. Said flow may be controlled to a predetermined pressure at the additive discharge outlet 39 by use of a power unit (not shown) controlled conventionally by a VFD or in a case of DC motors, by an SRM.

With reference to FIG. 1, the present invention may also include mechanical pressure sensitive valves 59, 60, 61 positioned at the additive conduit juncture 56, 57, 58 between each first-portion of additive carrying conduit 65, 66, 67 and the end-portion of conduit with spray nozzle set 68, 69, 70. Said mechanical pressure sensitive valves 59, 60, 61 may each serve as a check valve that prevents line drainage of a first-portion of additive carrying conduit 65, 66, 67. In operation said mechanical pressure sensitive valves 59, 60, 61 may act on the flow of fluid additive 8 by cutting off the flow at said additive conduit juncture 56, 57, 58 until a certain threshold of line pressure, in a corresponding additive carrying conduit 41, 42, 43, may be exceeded at the additive conduit juncture 56, 57, 58. Said line pressure being acted on by the additive pump 33 at the additive discharge outlet 39 and in turn through the corresponding open flow control valves 36, 37, 38, said open status being determined based on a fluid additive prescription 47 and from position information communicated by the irrigation system position sensor 30 to the processor 46 of the pump controller 34.

By this means a first-portion of additive carrying conduit 65, 66, 67, said first-portion being all but the 130 feet preceding the distal-end of conduit 53, 54, 55 (i.e., the end-portion of conduit with spray nozzle set 68, 69, 70, of each additive carrying conduit 41, 42, 43), may remain full (charged with fluid additive 8) that may not drain when the corresponding flow control valve 36, 37, 38 may be closed, thereby, reducing line pressure in corresponding additive carrying conduits 41, 42, 43 below said threshold pressure.

Use of a mechanical pressure sensitive valve 59, 60, 61 as disclosed above and illustrated in FIG. 1 may enable a quantity of additive fluid 8 to remain in said first-portion of additive carrying conduit 65, 66, 67 after loss of line pressure (below a threshold pressure) and, thereby, not require a refill of said first-portion of additive carrying conduit 65, 66, 67 when a corresponding flow control valve 36, 37, 38 may be controlled back open. The corresponding mechanical pressure sensitive valves 59, 60, 61, thereby, may maintain a fluid additive 8 in the respective first-portion of additive carrying conduits 65, 66, 67 even with below threshold line pressure and during the period of time a corresponding flow control valve 36, 37, 38 may be closed. Once a corresponding flow control valve 36, 37, 38 may be controlled from closed to open, providing above threshold line pressure, a fluid additive 8 may immediately flow into the end-portion of conduit with spray nozzle set 68, 69, 70, i.e., the 130 feet preceding the distal-end of conduit 53, 54, 55 that makes up the end-portion of conduit with a spray nozzle set 68, 69, 70.

With reference to FIG. 2, this method of using a mechanical pressure sensitive valve 59, 60, 61 at each conduit juncture 56, 57, 58 and between a corresponding first-portion of additive carrying conduit 65, 66, 67 and a corresponding end-portion of conduit with spray nozzle set 68, 69, 70 may provide more timely and effective discharge of additive 8 within the boundaries of any plurality of polygon shaped areas 22 of a field sector 4 of field 1.

In other embodiments of the present invention, and continuing with the same example, the position of a flow control valve 36, 37, 38 may be changed from being located at a first-end of additive carrying unit 50, 51, 52 (FIG. 1) to being located at the additive conduit juncture 56, 57, 58 of a first-portion of conduit 65, 66, 67 that does not include a plurality of discharge spray nozzles (in the example, all but the last 130 feet) and an end-portion of conduit with a spray nozzle set 68, 69, 70 (e.g., the 130 feet preceding each distal-end of conduit 53, 54, 55). In this configuration said repositioned flow control valves 36, 37, 38 would also serve the purpose of the mechanical pressure sensitive valves 59, 60, 61 discussed above, and, thereby, may make said mechanical pressure sensitive valves 59, 60, 61 unnecessary.

Thus, in application, the present invention with reference to FIG. 2 discloses a method and apparatus for spatially varying the application of a fluid additive 8 pumped into the boundaries of any plurality of polygon shaped areas 22 within any plurality of sectors 4 of a field 1 using a dedicated additive spraying machine 10. In effect, the present invention enables the broad-scale repurposing of irrigation systems from irrigation machines 9 into being dedicated additive spraying systems 10, thereby, capable of applying a wide variety of fluid additives 8 to a field 1 with discrete field sectors 4 and within the boundaries of any plurality of polygon shaped areas 22, including the application of fertilizers, herbicides, foliates, and pesticides, and to apply said fluid additives 8, with or without the simultaneous pumping of an available water supply 2 through the conventional water bearing conduit 20 of the dedicated additive spraying system 10 utilizing irrigation system 9.

The inventors have recognized the drawbacks in known irrigation systems, particularly in the area of apparatus utilized to add or inject an additive into the irrigation water being applied to the plants or soil of the agricultural field. Conventionally, the primary fluid supply (available water supply 2) to an irrigation system 9 may flow (or be pumped) at a constant rate, e.g., 850 gallons per minute or about 7.0 gallons per minute per acre for a typical 120-acre irrigation system. Therefore, the rate of application of an available water supply 2 through said irrigation system 9 to a ground surface 3 of a field 1 may generally be varied by adjusting the speed of movement over the ground surface 3 of the roving pipe spans 11, 12, 13 of the irrigation system 9, as said constant volume of an available water supply 2 may be applied to a ground surface 3.

In this manner of varying the speed of movement of the pipe spans 11, 12, 13 over a ground surface 3 the application of a fluid additive 8 that may be injected into the available water supply 2 may also be varied. However, with even the use of faster paced movement of the pipe spans 11, 12, 13 the dilution of a fluid additive 8 with respect to the quantity of an available water supply 2 may exceed the minimum dilution required for the efficacy of a particular fluid additive 8 that may be applied to a growing crop 7. This limitation is removed by application of the present invention.

The present invention may utilize an irrigation system 9 for a dedicated additive spraying system 10 and in the process remove any requirement for simultaneously pumping an available water supply 2 as a medium or carrier for the application of a fluid additive 8. Furthermore, should the application of a fluid additive 8 require an available water supply 2 to be simultaneously applied to a crop 7 being treated with a fluid additive 8 by the dedicated additive spraying system 10, the present invention facilitates such optional application of an available water supply 2. Such simultaneous application of both an additive 8 and an available water supply 2 may be required for application of fluid additives 8 that treat root-zones of plants and not the above ground foliage of growing crops 7.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and shown in the drawing figures may be altered in a variety of ways. For example, the order of the steps may be rearranged, sub steps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to fall that within the scope of the claims.

We claim:

1. An irrigation system for distributing an available water supply over a ground surface of a field, said irrigation system being utilized by a dedicated additive spraying system movable over the ground surface to distribute a fluid additive to a growing crop or over the ground surface with or without a simultaneous pumping of an available water supply, the dedicated additive spraying system comprising:

at least two pipe spans generally extending outward forming an axis of a longitudinal length of a water-bearing conduit, the at least two pipe spans forming a fluid additive path;

at least two support towers configured to support the pipe spans above the ground surface;

said conduit configured to apply a water supply to the ground surface of the field;

an irrigation system position sensor configured to monitor and report a current position of the pipe spans of the irrigation system with respect to a reference position of the spans;

an additive pumping apparatus comprising:

a reservoir configured to hold a quantity of the fluid additive, the fluid additive path originating at the reservoir, a plurality of flow control valves to control a flow of the fluid additive through corresponding additive carrying conduits, said additive carrying conduits each including a first-portion of said additive carrying conduit terminating at an additive conduit juncture with an end-portion of said additive carrying conduit with a spray nozzle set, and wherein a plurality of end-portion of the additive carrying conduits each with the spray nozzle set may each terminate at a distal-end of the additive carrying conduit, each said distal end of the additive carrying conduit being located along an axis of a longitudinal length of the water bearing conduit, a location of distal-end of conduit determined by a length of each corresponding additive carrying conduit; and a pump controller with memory to store a fluid additive prescription, said prescription providing pipe span positions for opened and closed operating parameters, said pump controller using a processor to compare stored opened operating parameters and stored closed operating parameters to a current pipe span position of the pipe span positions and based on said comparison to act on corresponding flow control valves to either open or close the corresponding flow control valves to thereby either start or stop a flow of fluid additive to the corresponding additive carrying conduits, said additive carrying conduits configured to apply said fluid additive to any plurality of corresponding discrete polygon-shaped areas within any plurality of field sectors of the field.

2. The system of claim 1, wherein the pump controller of the additive pumping apparatus is in communication with the irrigation system position sensor to receive information regarding the current position of the pipe spans; and wherein the pump controller of the additive pumping apparatus is in communication with the plurality of flow control valves to control operation of the flow control valves opened and closed based on a current position of said pipe spans as compared to stored operating parameters such as field sector start positions and field sector stop positions and thereby control the flow of the fluid additive to corresponding polygon-shaped areas of a field.

3. The system of claim 1, wherein the additive pumping apparatus is configured with a memory to receive and store a fluid additive prescription with operating parameters such as field sector start positions and field sector stop positions for pipe spans entering and leaving field sectors; and wherein the pump controller is configured to use a processor to initiate pumping of a fluid additive through the corresponding flow control valve when a stored field sector start position coincides with a current position; and wherein the pump controller is configured to use a processor to discontinue pumping of a fluid additive through the corresponding flow control valve when a stored field sector stop position coincides with a current position.

4. The system of claim 1, wherein the additive pumping apparatus is configured to initiate pumping of the fluid additive to any plurality of polygon-shaped areas within a field sector at a corresponding field sector start position for the pipe spans and discontinue pumping of the fluid additive to any corresponding plurality of polygon-shaped areas at a corresponding field sector stop position of the pipe spans.

5. The system of claim 1, wherein the additive pumping apparatus additionally comprises an additive pump in fluid communication with the reservoir by way of an additive fluid pathway and with an additive discharge outlet, said additive discharge outlet in fluid communication with any plurality of flow control valves.

6. The system of claim 5, wherein the additive pump includes a variable speed motor configured to maintain a set pressure at an additive discharge outlet.

7. The system of claim 1, wherein the flow control valves may be in fluid communication with and located proximate to an additive discharge outlet, said discharge outlet in fluid communication with a corresponding first-portion of additive carrying conduit.

8. The system of claim 1, wherein each additive carrying conduit may include a mechanical pressure sensitive valve at an additive conduit juncture of a first-portion of additive carrying conduit and an end-portion of conduit with spray nozzle set.

9. The system of claim 1, wherein the corresponding flow control valves may each be located at an additive conduit juncture of the first-portion of additive carrying conduit and an end-portion of conduit with spray nozzle set, and thereby make the use of mechanical pressure sensing valves unnecessary.

10. The system of claim 1, wherein each flow control valve, when controlled open, may be in fluid communication with a corresponding one of a plurality of additive-carrying conduits, each additive-carrying conduit may be configured with a first-portion of additive-carrying conduit and with an end-portion of conduit with a spray nozzle set, each end-portion of conduit with spray nozzle set may be configured to apply or not apply a fluid additive within boundaries of any polygon-shaped areas within discrete field sectors of a field, said polygon shaped areas underlying respective end-of conduit with spray nozzle set being in fluid communication with a corresponding flow control valve.

* * * * *